United States Patent [19]

Hayasaka et al.

[11] 4,191,623
[45] Mar. 4, 1980

[54] METHOD OF PRODUCING MICROPOROUS FILMS

[75] Inventors: Kuniyuki Hayasaka; Yutaka Tamaoka, both of Akashi, Japan

[73] Assignee: Honny Chemicals Company, Limited, Kobe, Japan

[21] Appl. No.: 862,526

[22] Filed: Dec. 20, 1977

[30] Foreign Application Priority Data

Dec. 21, 1976 [JP] Japan ................... 51/152921

[51] Int. Cl.$^2$ .................. B01D 13/02; C25B 13/00
[52] U.S. Cl. ................. 204/180 R; 204/296; 204/301
[58] Field of Search ............ 204/180 R, 299, 301, 204/252, 296

[56] References Cited

U.S. PATENT DOCUMENTS 3,520,874   7/1970   Veno et al. ............ 204/180 R X
3,718,561   2/1973   Jacob ................... 204/180 R

FOREIGN PATENT DOCUMENTS 5019591    1/1971   Japan .
25971971  10/1972   Japan .

*Primary Examiner*—Arthur C. Prescott
*Attorney, Agent, or Firm*—Stevens, Davis, Miller & Mosher

[57] ABSTRACT

Microporous film having a microporous surface layer, and a method of producing it are provided. The method comprises placing a dope containing a film-forming polymer, a solvent therefor and an ionizable organic compound on a support and passing the dope bearing support through a coagulation bath under the application of an electric current. The resultant film has a microporous structure made up of open, vertically elongated and uniform cells.

12 Claims, No Drawings

METHOD OF PRODUCING MICROPOROUS FILMS

This invention relates to a method of producing microporous films or layers. More particularly, the invention relates to a method of producing a microporous film characterized in that said method comprises applying a film-forming dope comprising a film-forming polymer and a solvent together with an ionizable organic compound on a support and passing it through a coagulation bath under the application of an electric current.

Among the hitherto-known methods for the production of microporous film there may be mentioned: (1) the use of a blowing agent, (2) mechanical drilling of pores, (3) a film-forming method involving the use of emulsions, (4) the powder fusion method, (5) the method in which fibrous materials are blended into a polymer dope and wet processed, (6) the method in which a liquid component is gasified to escape, (7) the method in which a solid component is extracted or leached out with a solvent and (8) the method which comprises extracting the solvent into non-solvent for the resin.

The above methods, however, require careful control of a great many factors such as the amount of blowing agent, temperature conditions, the type and concentration of polymer solution, additives, and others, and, for commercial purposes, entail the problems of poor reproducibility and workability.

The most prevalent of the above methods is the so-called wet process which comprises extracting the solvent from a resin solution into a non-solvent for the resin. However, in this method in order to sufficiently remove the solvent, the film must be immersed in water, hot water or other non-solvent for the polymer for a period of 30 to 80 minutes, thus being disadvantageous from an efficiency point of view. Moreover, the resultant microporous layer is not uniform but irregular, and its micropores are spherical or transversely elongated in cross-section and irregular in shape and size.

Japanese Patent Publication No. 19591/1975 discloses a method in which extractive removal of the solvent into a non-solvent for the resin is hastened by the passage of an electric current through the coagulation bath and, in certain cases, by the previous addition of an inorganic metal salt to the dope or stock solution to increase heat resistance of the product.

In that method, the time required for removal of the solvent can be reduced to some degree and the resultant pores are open, cellular and, predominantly, oval. However, the microporous layer is not uniform in the sectional shape of its pores and is lacking in the bulk or "full hand" necessarily desirable for use of the microporous film in fabrics. Furthermore, its elastic recovery, scratch resistance and other physical parameters are unsatisfactory.

Japanese Patent Publication No. 2597/1971 discloses a method wherein an anionic surfactant is added to the dope prior to passage into the coagulation bath for the purpose of controlling pore size, but does not utilize electric current.

This invention has been made to accomplish improvements in the physical properties of microporous film and in the process for its manufacture.

In accordance with this invention, a film-forming dope comprising a film-forming polymer and a solvent as well as an ionizable organic compound is coated on a support and the support thus coated is immersed in a coagulation bath. Then an electric current is applied, the organic ion of the ionizable organic compound rapidly escapes into the coagulation bath in a uniform controlled manner by electrophoresis to leave a uniform microporous film. In the preferred embodiment of the invention, the surface of the film-forming dope layer is oriented in the direction of electrophoretic migration of the organic ion of said ionizable organic compound using direct current. That is to say the electrodes are arranged in accordance with the polarity of said ionizable compound, whereby the direction of electrophoretic migration of the organic ion of said ionizable organic compound is rendered constant and, accordingly, as the doped support is passed through said coagulation bath, vertically elongated micropores are produced. It is to be understood that the invention is not limited to the use of a direct electric current since improvements over the prior art can be achieved using direct current superimposed on alternating current or even with alternating current alone. However optimum results that are best understood have been achieved with direct current to date.

Therefore, this invention is directed to a method of producing a microporous film characterized in that said method comprises applying a film-forming fope composed of a film-forming polymer and a solvent as well as an ionizable organic compound on a support and passing the dope coated support through a coagulation bath under the application of an electric current in such a manner that the surface of the film-forming dope layer faces in the direction of electrophoretic migration of the organic ion of said ionizable organic compound when direct current is used.

The method of this invention will hereinafter be described in further detail. Thus, a film-forming stock solution or dope containing a film-forming polymer and a solvent as well as an ionizable organic compound is applied on a support by dipping, coating or other procedure and the support thus coated is then passed into a coagulation bath miscible with said ionizable organic compound. Electrodes are placed within the coagulation bath and an electric current, preferably a direct current, is passed through the bath when the coated support traverses the area between the electrodes. When direct current is used, the film-forming dope layer faces the direction of migration of the organic ion of the ionizable organic compound.

The support carrying such a microporous film is taken from the coagulation bath, washed to remove the coagulant and residual solvent and dried by heating, e.g. in a current of heated air.

In the above process, the coagulation of the dope on the support takes place in three zones, namely partial gelation in a current-free Zone I, the electrophoretic escape of the organic ion of the ionizable organic compound, during which time the gelation process continues (Zone II), and the completion of coagulation in a current-free Zone III. When the partial gelation in current-free Zone I is controlled, a thick or bulky film is more readily formed. In the preferred embodiment of this invention, the polymer dope is held in Zone I of the coagulant bath for 5 seconds to 5 minutes before passage through the electrolysis Zone II. Thus a controlled partial gelation of the polymer dope advantageously occurs prior to electrophoretic migration of the organic ion, resulting finally in a thicker microprous layer. Since the electrophoretic migration of the ionizable organic compound in the current zone is influenced by such conditions as the current density, the spacing of electrodes, area of the electrodes, and the length (traversing time) of the current region, the conditions of current are optionally selected with reference to the type, concentration, viscosity and other parameters of the film-forming polymers, ionizable organic compound, and other components of the film-forming dope.

It will be noted from the Examples hereinafter that the thickness of the microporous film is related not only to the time in Zone I but also the current density in Zone II and to a lesser degree to the time in Zone II and the amount of surfactant in the dope. Thus one can optimize the thickness of the microporous film in relation to other physical properties by adjustment of these parameters.

In the method of this invention, stages of gelation, current treatment and rinse may be carried out in a single vessel or, alternatively, each in an independent vessel.

The dope coated fabric is caused to dwell in Zone I for a period of 3 seconds to 10 minutes, preferably 5 seconds to 5 minutes; in Zone II for 10 seconds to 10 minutes, preferably 30 seconds to 5 minutes at current densities of 0.5 to 5 A/dm$^2$, preferably 1 to 4 A/dm$^2$; in Zone III for 2 to 20 minutes, preferably 5 to 10 minutes. It is to be understood that longer or shorter times than the above mentioned are well within the scope of the invention depending on the electrode surface area, voltages, electrode spacing, bath dimensions, temperature, type of polymer dope and other operating parameters. In any event the results achieved with this process at total immersion times in all three stages of less than 30 minutes, preferably 20 minutes or less are striking in comparison with those achieved by the so-called conventional "wet processing" or solvent/non-solvent coagulation methods for producing microporous film which require as much as 30 to 80 minutes or more immersion in the coagulation bath as well as complicated mixing and treating conditions. The results achieved by the invention are such that an applied dope 1 mm thick for example, consistently produces a thicker microporous film, e.g. up to 1.8 mm while the conventional "wet process" of coagulation produces a microporous film whose thickness is essentially the same as that of the applied dope.

Thus, the invention has the following advantageous features.

(a) A microporous film can be produced continuously, quickly and with efficiency.

(b) An open-cell structure made up of vertically elongated micropores which are uniform in size and shape can be produced.

(c) The resultant microporous film has bulk or a "full hand" and excels in elastic recovery, scratch resistance and other physical properties.

(d) In operating the process, it is easy to control the physical properties of the film and the coagulation bath parameters.

As examples of the film-forming polymer to be employed according to this invention, polyurethane resins, halo-vinyl polymers (inclusive of copolymers with other ethylenically unsaturated monomers), polyamides, polyester amides, polyesters, polyvinyl butyral, poly-α-methylstyrene, polyvinylidene chloride, homo- or copolymers of acrylic and methacrylic acid esters, polystyrene, polyethylene, polypropylene, chlorosulfonated styrene polymers, butadiene-acrylonitrile copolymers, acrylonitrile-butadiene-styrene copolymers, cellulosic esters and ethers, may be mentioned. We have found polyurethane and polyamide resins to be preferable for our purposes.

The solvent to be employed must be such that it will be substantially miscible with the coagulant solution. N,N-dimethylformamide or mixtures thereof with tetrahydrofuran and dioxane are particularly desirable in that they dissolve many of the abovementioned polymers well and are miscible with water and other generally acceptable coagulant liquids. Other useful solvents include dimethylsulfoxide, tetrahydrofuran, tetramethylurea, N,N-dimethylacetamide, N-methyl-2-pyrrolidone, dioxane, γ-butyrolactone, and the like. Mixtures of such solvents with various water-soluble liquids such as ketones and alcohols are also useful. When a nonsolvent-type liquid for the polymer such as hexane or methanol is used as the coagulant, such organic liquids as ethyl acetate, butylcarbinol, toluene, phenol, chloroform, and the like, may also be employed in the polymer dope within limits not detrimental to the properties of the polymer employed. Moreover, such nonsolvent coagulants may be admixed with the resin solution in limited proportions and at any time before the resin solution is applied to the support.

As said ionizable organic compounds, cationic surfactants, anionic surfactants, and cationic or anionic high molecular weight polymeric electrolyte compounds may be employed alone or in combination.

As examples of the anionic surfactants, there may be mentioned fatty acid salts, higher alcohol sulfuric acid ester salts, alkylbenzenesulfonates, alkylnaphthalenesulfonates, naphthalenesulfonic acid-formaldehyde condensates, dialkylsulfosuccinates, alkylphosphates, polyoxyethylene sulfate salts, and so forth. The cationic surfactants include alkylamine salts, quaternary ammonium salts, polyoxyethylene alkylamines, and the like. The anionic high molecular weight polymeric electrolytes include the carboxylic acid salts represented by the general formula: $R[O(CH_2)_n]_x$ COOH.B, RO-CO(CH$_2$).COOH.B (wherein B is an organic amine) or

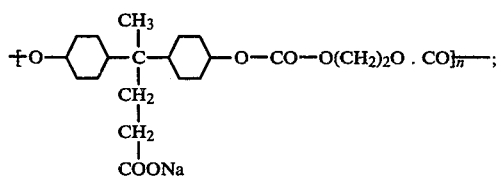

salts of copolymers of styrene, vinyl acetate, methyl methacrylate, vinyl alcohol fatty acid vinyl esters with maleic anhydride, salts of vinyl acetate-crotonic acid copolymers, copolymers of styrene with styreneundecanoic acid satls, polymeric organic phosphonic acids, phosphinic acids, phosphite esters and phosphoric acid esters and other phosphoric acid derivatives, polysulfonic acids, polysulfinic acids and their derivatives, and so forth. As cationic high molecular weight polymeric electrolytes, there may be employed polymers of acrylamide and its derivatives, polymers of vinyl ether and its derivatives, polymers of vinyl nitrogen derivatives, polyamine resins and so forth. In our practice of the invention, we prefer to use dialkylsulfosuccinates as anionic agents and quarternary ammonium salts as cationic agents.

Particularly superior results are obtained when such ionizable organic compounds are used in the range of 0.1 to 50 parts by weight per 100 parts of the solid fraction of the film-forming polymer and preferably in the range of 1 to 30 parts by weight on the same basis. At levels of addition below 0.1 part by weight, the compounds will not contribute to the formation of micropores, while the addition of more than 50 parts by weight results in a substantial residue of ionizable organic compound within the microporous film, with the consequent undesirable result of the micropores collapsing in the drying step. For such purposes as coloring and other modifications of the microporous film, it is permissible to incorporate in the polymer dope pigments, dyes, plasticizers, fillers, bulk-builders, dispersion stabilizers, antioxidants and other additives. Furthermore, nonionic surfactants may be employed as modifying additives along with said ionizable organic compounds. Among said nonionic surfactants are polyoxyethylene alkyl ethers, polyoxyethylene alkyl phenol ethers, sorbitan fatty acid esters, polyoxyethylene sorbitan fatty acid esters, polyoxyethylene acyl esters, oxyethylene oxypropylene block polymers, aliphatic monoglycerides, and the like.

The concentration of polymer in the film-forming dope may vary over a wide range provided that the dope may be supported on the support. Preferably, however, it is used in the range of 5 to 30 weight percent.

The term 'support' as used herein means any and all of such substrates as a woven fabric, nonwoven fabric, knitted fabric, porous web, and the like; mold-release paper, synthetic paper, plastics and other nonconductive materials.

The application of said film-forming dope on said support may be accomplished by a variety of methods, such as knife coating, dipping, brushing, spraying, extrusion, gravure printing, roll coating, and the like. Knife, dip and roll coating methods are preferred.

As the coagulation bath, water is the most desirable coagulant from economy and safety points of view. Other useful coagulants include ethylene glycol, propylene glycol, 1,3-butylene glycol, hexanediol, diethylene glycol, dipropylene glycol, glycol monoethyl ether, glycol monobutyl ether, hydroxy ether acetate, methanol, ethanol, propanol, isopropyl alcohol, butanol, sec-butanol, tert-butanol, hexane, benzene, toluene, xylene, naphtha, chloroform, tetrachloroethylene, trichloroethylene, and so forth. However, where the polymer is soluble in such organic solvents, water or mixtures of water with water-miscible liquids are generally desirable as the nonsolvent coagulant bath.

The coagulation bath is used at a temperature in the range of about 15° to 90° C. Excessively high temperatures are undesirable, for the surface of the film would then be irregular and/or the micropores once formed would be collapsed. However, heating the bath to an appropriate temperature is advantageous because the electric current will then flow more readily and, therefore, the operation may be conducted at a lower voltage. Therefore, depending on the polymer, 20° to 60° C. is preferred, and most preferably 30° to 50° C.

In the practice of this invention, the resistivity of the coagulation bath may be lowered by the addition of an electrolyte to the bath. If such an electrolyte is allowed to become dissociated in the coagulation bath to reduce the bath resistivity, the current flow will be increased, permitting a low-voltage operation which is economical and less hazardous.

The treatment with an electric current is effected by passing the dope-coated support between positive and negative electrodes within the coagulation bath. It should, however, be understood that when direct current is used, the layer of film-forming dope faces in the direction of migration of the organic ion of the ionizable organic compound; that is to say the particular electrode that will attract the organic ion of the ionizable organic compound faces the film-forming dope layer. The conditions of current flow, i.e. electrode surface area, the distance between electrodes, voltage, current density, and such, may be selected as desired according to the types of film-forming polymer, ionizable organic compound, and factors related to the polymer dope.

The microporous film produced according to the invention can be used in such applications as simulated leather sheeting, other materials of which air- and moisture- permeability are required, cushioning materials, heat insulation materials and so forth.

The method according to this invention will hereinafter be further described by way of the following examples. In the following examples and preparations, all parts are by weight.

Preparation of a polyurethane resin solution:

306 parts of a polyester with a hydroxyl value of 110, as prepared from 1,4-butanediol and adipic acid, 27 parts of 1,4-butanediol, 1113 parts of N,N-dimethylformamide and 150 parts of 4,4'-diphenylmethane diisocyanate were polymerized with the aid of 8.0 parts of dibutyltin dilaurate as the catalyst under a nitrogen blanket, whereby a polyurethane resin solution with a viscosity of approximately 80,000 cps/30° C. and a concentration of 30% soldis was obtained.

Preparation of film-forming dopes No. 1 through No. 4:

To 100 part aliquots of the above polyurethane resin solution were added 200 parts, 150 parts and 100 parts, respectively, of N,N-dimethylformamide to prepare solutions of 10% concentration (Dope No. 1), 15% concentration (Dope No. 2) and 20% concentration (Dope No. 3). In addition, a 15% red colored solution (Dope No. 4) was prepared by adding 20 parts of a colorant (Dylac L, ® Dai Nippon Ink. K.K.) to the same dope as Dope No. 2.

EXAMPLE 1

To 100 parts of Dope No. 4 prepared above was added 1.0 part of sodium di-2-ethylhexylsulfosuccinate (anionic surface active agent) to prepare a homogeneous solution. This dope composition was coated by doctor-knife coater on a napped fabric to a thickness of 1.0 mm and the coated fabric was passed into a water bath at 20° C. for 6 seconds to effect partial gellation (Zone I). The fabric was caused to travel further between a pair of 18×25 cm stainless steel plate electrodes positioned 10 cm apart, with the coated face of the fabric facing the anode, for 3 minutes during application of a direct current of 3.5 A/dm$^2$ at an applied voltage of 190 volts (Zone II). Thereafter, the fabric was further passed through Zone III of the coagulation bath for 7 more minutes to complete coagulation, after which time it was taken out, rinsed with water at 80° C. for 5 minutes and dried in a current of heated air at 80° C.

EXAMPLE 2

The procedure described in Example 1 was repeated except that 1.0 part of stearyltrimethylammonium chloride (cationic surface active agent) was used in lieu of sodium di-2-ethylhexylsulfosuccinate and the electric current was applied with the coated face of the fabric facing the cathode.

Control Examples 1 through 3

The procedure of Example 1 was repeated except that: (i) No electric current was applied. (Control Ex. 1)

(ii) The electric current was applied but no surfactant was employed. (Control Ex. 2).

(iii) The electric current was applied and 1.0 part of polyoxyethylene nonyl phenyl ether (a non-ionic surfactant) was used in lieu of sodium dialkylsulfosuccinate (Control Ex. 3).

In each control example, the coated fabric required further passage through Zone III of the coagulation bath for 15 minutes to effect equivalent removal of solvent, and complete gellation of the polymer, as in the Example 1, after which it was taken out, rinsed with water for 5 minutes and dried.

The microporous films obtained above in Examples 1 and 2 and Control Examples 1 through 3 are as set forth in Table 1.

Table 1

|  |  | Example 1 | Example 2 | Control Ex. 1 | Control Ex. 2 | Control Ex. 3 |
| --- | --- | --- | --- | --- | --- | --- |
|  | Thickness of film (mm) | 1.3 | 1.3 | 1.0 | 1.0 | 1.0 |
|  | Feeling of film | Flexible & "full hand" | Flexible & "full hand" | Rigid & "thin hand" | Rigid & "thin hand" | Rigid & "thin hand" |
| Physical properties | Elastic[a] recovery | >90% | >90% | <80% | <80% | <80% |
|  | Scratch[b] resistance | 1 | 1 | 3 | 3 | 3 |
| Sectional appearance of film, as viewed with optical magnification |  | Vertically elongated, uniform open cells | Vertically elongated, uniform open cells | Round or oval and irregular cells, with large cells in the lower layer | Round or oval and irregular cells, with large cells in the lower layer | Round or oval and irregular cells, with large cells in the lower layer |

[a] 3 kg compressive load on 5 × 5 cm sample for 24 hours at 20° C. 1 hour recovery time, then measured % return to original thickness.
[b] Fingernail scratch rated:
(1) Difficult to scratch;
(2) Moderate scratch resistance;
(3) easily scratched.

(b) Fingernail scratch rated: (1) Difficult to scratch; (2) Moderate scratch resistance; (3) Easily scratched.

EXAMPLES 3 through 15

The procedure of Example 1 was repeated except that the amount of sodium di-2-ethylhexylsulfosuccinate (anionic surfactant) per 100 parts of Dope No. 4 and the conditions of application of the electric current were varied. The results are shown in Table 2.

Table 2

| Variable \ Example | 3 | 4 | 5 | 6 | 7 | 8 | 9 | 10 | 11 | 12 | 13 | 14 | 15 |
| --- | --- | --- | --- | --- | --- | --- | --- | --- | --- | --- | --- | --- | --- |
| Amount of sodium di-2-ethylhexysulfosuccinate (parts) | 0.2 | 0.2 | 0.2 | 0.2 | 1 | 1 | 1 | 1 | 4 | 4 | 4 | 4 | 4 |
| Electric current (A/dm$^2$) | 2.0 | 2.0 | 3.5 | 3.5 | 2.0 | 2.0 | 3.5 | 3.5 | 0.5 | 2.0 | 2.0 | 3.5 | 3.5 |
| Current time (min.) | 1 | 3 | 1 | 3 | 1 | 3 | 1 | 3 | 3 | 1 | 3 | 1 | 3 |
| Thickness of microporous film, mm | 1.3 | 1.4 | 1.3 | 1.5 | 1.4 | 1.4 | 1.4 | 1.4 | 1.0 | 1.5 | 1.5 | 1.5 | 1.5 |

EXAMPLE 16

The procedure of Example 1 was repeated except that the temperature of the coagulation bath was altered to 40° C., 70° C. and 95° C. The characteristics of the resultant microporous films are set forth in Table 3.

Table 3

| 40° C. | 70° C. | 95° C. |
| --- | --- | --- |
| A microporous film with a smooth and flat surface; "full hand"; vertically elongated, uniform cells as viewed, in section, by optical magnification | A microporous film with a smooth and flat surface; "full hand"; vertically elongated, uniform cells as viewed, in section, by optical magnification | A microporous film with a corrugated surface; irregular-sized cells as viewed, in section, by optical magnification. |

EXAMPLE 17

The procedure of Example 1 was repeated except that Dopes No. 1 to No. 3 were respectively used in lieu of Dope No. 4.

The resultant microporous films had a "full hand" with a smooth and flat surface, presenting, on sectioning, vertically elongated and uniform micropores, thus resembling the film obtained in Example 1.

EXAMPLE 18

The procedure of Example 1 was repeated except that a polyester film coated with Dope No. 4 to a thickness of 1.0 mm was employed in lieu of the napped fabric. The resultant microporous film was 1.5 mm thick and, as viewed with optical magnification in section, had vertically elongated, uniform micropores. This microporous film was peeled off from the polyester and laminated to a matrix fabric. The resultant product had a smooth, flat surface and a "full hand", with resiliency.

Preparation of Dope No. 5:

334 parts of a polytetramethylene ether glycol with a molecular weight of approximately 1000 was mixed with 30 parts of toluene diisocyanate and the mixture was heated at about 80° C. for 4 hours. Then, 250 parts of the above hydroxyl-terminated polymer was mixed with 57 parts of methylene-bis-4-phenyl isocyanate and the mixture was heated at 80° C. for 2 hours to prepare an isocyanate-terminated prepolymer. The prepolymer was dissolved in 1000 parts of N,N-dimethylformamide. Then, a solution of 5 parts of hydrazine hydrate in 150 parts of N,N-dimethylformamide was added and the mixture was heated at 70° C. for one hour. By the above procedure was obtained a polyurea solution with a viscosity of approximately 70,000 cps and a solids content of 20%.

EXAMPLE 19

A microporous film was produced by repeating the procedure of Example 1 except that 1.0 part of sodium di-2-ethylhexylsulfosuccinate was added to the above filming-forming Dope No. 5.

Control Example 4

The procedure of Example 1 was repeated except that 100 parts of the polyurea solution obtained in Example 19 was mixed evenly with 4 parts of zinc chloride and 10 parts of water. This control typifies the prior art of Japanese Patent No. 19591/1975.

The characteristics of the microporous films obtained in Example 19 and Control Example 4 are shown below.

Table 4

| Thickness of film (mm) | Example 19 1.5 | Control Ex. 4 1.3 |
|---|---|---|
| Appearance of film | A flat smooth surface; in section, vertically elongated and uniform open cells in the section as viewed by optical magnification. | A corrugated surface, with oval cells unevenly distributed across the section as viewed by optical magnification |

EXAMPLE 20

A napped fabric was coated with Dope No. 4 containing 1.0 part of sodium diethylhexylsulfosuccinate according to Example 1, and the coated fabric was immersed in a water bath (Zone I, as defined earlier) at 20° C. for 10 seconds to effect partial gellation. Thereafter it was subjected to a direct electric current (Zone II), further coagulated (Zone III), rinsed and dried as described in Example 1.

Control Examples 5 and 6

The procedure described in Example 20 was repeated except that (i) Immersion time in Zone I was 2 seconds (Control Ex. 5)

(ii) Immersion time in Zone I was 7 minutes (Control Ex. 6)

The comparative results of Example 20 and Control Examples 5 and 6 are given in Table 5.

Table 5

| | Example 20 | Control Example 5 | Control Example 6 |
|---|---|---|---|
| Time in Zone I | 10 seconds | 2 seconds | 7 minutes |
| Final thickness in mm of microporous film produced. | 1.5 | 1.2 | 1.0 |

Example 21

The procedure of Example 1 was repeated except that immersion time in Zone I was 5 minutes and in Zone II an alternating current of 3.5 A/dm$^2$ was applied for 3 minutes.

EXAMPLE 22

The procedure of Example 21 was repeated except that 10.0 parts of stearyl trimethylammonium bromide (cationic surfactant) was used in place of sodium di-2-ethylhexylacrylate and the immersion time in Zone I was 2 minutes.

Control Examples 7 through 9

The procedure of Example 21 was repeated except that:

(i) No electric current was applied (Zone II) (Control Ex. 7)

(ii) No surfactant was employed (Control Ex. 8)

(iii) 1.0 part of polyoxyethylene nonyl phenyl ether was employed in place of sodium di-2-ethylhexylsuccinate.

In each Control Example 7, 8 and 9, there was required further immersion in the coagulation bath (Zone III) for 15 minutes to effect equivalent removal of solvent and full gellation of the polymer as in Example 21.

The thickness of the microporous films obtained above in Examples 21 and 22 and Control Examples 7 through 9 are as set forth in Table 6.

Table 6

| Example | 21 | 22 | Control 7 | Control 8 | Control 9 |
|---|---|---|---|---|---|
| Thickness of film in mm | 1.4 | 1.6 | 1.0 | 1.0 | 1.0 |

In addition to the variations in thickness shown above, the control films were inferior in elastic recovery, scratch resistance and pore uniformity.

EXAMPLE 23

The procedure of Example 21 was reported except Dope No. 5 was used and the immersion time in Zone I was 1 minute.

Control Example 10

The procedure of Example 23 was repeated except that 100 parts of the polyurea solution used in Example 23 was mixed evenly with 4 parts of zinc chloride and 10 parts of water.

The characteristics of the microporous films obtained in Example 23 and Control Example 10 are shown below.

Table 7

| Thickness of film in mm | Example 23 | Control Example 10 |
|---|---|---|
| | 1.8 | 1.3 |
| Appearance of film | A flat smooth surface; vertically elongated and uniform open cells in section as viewed by optical magnification | A corrugated surface; with oval cells unevenly ditributed across the section as viewed by optical magnification |

EXAMPLES 24 through 36

The procedure of Example 20 was repeated except that the amount of sodium di-2-ethylhexylsulfosuccinate per 100 parts of Dope No. 4 and the conditions of application of the direct electric current were varied. The results are shown in Table 8. These are to be compared with those in Table 2.

Table 8

| Variable \ Example | 24 | 25 | 26 | 27 | 28 | 29 | 30 | 31 | 32 | 33 | 34 | 35 | 36 |
|---|---|---|---|---|---|---|---|---|---|---|---|---|---|
| Amount of sodium di-2-ethylhexylsulfosuccinate (parts) | 0.2 | 0.2 | 0.2 | 0.2 | 1 | 1 | 1 | 1 | 4 | 4 | 4 | 4 | 4 |
| Electric current (A/dm$^2$) | 2.0 | 2.0 | 3.5 | 3.5 | 2.0 | 2.0 | 3.5 | 3.5 | 0.5 | 2.0 | 2.0 | 3.5 | 3.5 |
| Current time (min) | 1 | 3 | 1 | 3 | 1 | 3 | 1 | 3 | 3 | 1 | 3 | 1 | 3 |
| Thickness of microporous film in mm | 1.5 | 1.6 | 1.5 | 1.7 | 1.6 | 1.6 | 1.8 | 1.8 | 1.2 | 1.6 | 1.6 | 1.8 | 1.8 |

As many possible embodiments may be made of this invention without departing from the scope thereof; it is to be understood that all matter herein set forth is to be interpreted as illustrative and not as unduly limiting the invention.

What is claimed is:

1. A method of producing a microporous film comprising applying a film-forming dope containing a film-forming polymer and a solvent together with an ionizable organic compound on a support and passing said support through a coagulation bath between electrodes under the application of an electric current.

2. A method as set forth in claim 1 wherein said electric current is direct current applied with said film-forming dope layer on said support facing in the direction of migration of the organic ion of said ionizable organic compound.

3. A method as set forth in claim 1 wherein said ionizable organic compound is an anionic surfactant, a cationic surfactant or a high molecular weight polymeric electrolyte compound.

4. A method as set forth in claim 1 wherein said coagulation bath comprises a system which does not dissolve said film-forming polymer but is miscible with said ionizable organic compound.

5. A method according to claim 2 wherein the dope-bearing support is passed through three zones of a coagulating bath, the dope-bearing support is maintained in said first zone for 3 seconds to 10 minutes to effect partial coagulation, then passed through a second zone between at least one pair of electrodes for a period of 10 seconds to 10 minutes to cause further gellation and rapid migration of said organic ion, and thereafter passed through a third zone for a period of 2 to 20 minutes to complete gellation, the total time of immersion in said bath being less than 30 minutes.

6. A method according to claim 1 wherein said ionizable organic compound is an anionic surfactant.

7. A method according to claim 1 wherein said ionizable organic compound is a cationic surfactant.

8. A method according to claim 1 wherein said film-forming polymer is a polyurethane.

9. A method according to claim 1 wherein said electric current is direct current.

10. A method according to claim 1 wherein the temperature of said bath is 20° C. to 60° C.

11. A product produced according to the method of claim 1.

12. A product produced according to the method of claim 2.

* * * * *